United States Patent
Raghavan

[11] Patent Number: 6,115,418
[45] Date of Patent: Sep. 5, 2000

[54] SIMPLIFIED EQUALIZER FOR TWISTED PAIR CHANNEL

[75] Inventor: Sreen A. Raghavan, La Jolla, Calif.

[73] Assignee: National Semiconductor Corporation, Santa Clara, Calif.

[21] Appl. No.: 09/020,628

[22] Filed: Feb. 9, 1998

[51] Int. Cl.[7] .............................. H03H 7/30; H03H 7/40; H03K 5/159

[52] U.S. Cl. .......................................... 375/233; 708/323

[58] Field of Search .................................... 375/229, 230, 375/232, 233, 234, 285, 346, 349, 350; 708/300, 319, 322, 323; 333/18, 28 R

[56] References Cited

U.S. PATENT DOCUMENTS

| | | |
|---|---|---|
| 4,456,893 | 6/1984 | Otani . |
| 4,701,936 | 10/1987 | Clark et al. . |
| 5,031,194 | 7/1991 | Crespo et al. . |
| 5,119,196 | 6/1992 | Ayanoglu et al. ........................ 358/167 |
| 5,617,450 | 4/1997 | Kakuishi et al. ........................ 375/230 |
| 5,895,479 | 4/1999 | Suganuma ................. 708/301 |

Primary Examiner—Tesfaldet Bocure
Assistant Examiner—Jean B. Corrielus
Attorney, Agent, or Firm—Skjerven, Morrill, MacPherson, Franklin & Friel LLP; Alan H. MacPherson; Gary J. Edwards

[57] ABSTRACT

A 100Base-TX detection system is presented which takes advantage of the form of the frequency response of the channel to provide a simplified filter for producing an output signal with reduced distortion. Utilizing the nature of the frequency response function of category-5 twisted pair cabling, a finite impulse response linear equalizer or an infinite impulse response decision feedback equalizer having as few as two multipliers is implemented.

11 Claims, 6 Drawing Sheets

SIMPLIFIED EQUALIZER FOR TWISTED PAIR CHANNEL

BACKGROUND

1. Field of the Invention

This invention relates to simplifying the equalizer needed to combat the intersymbol interference present in a digital communication system.

2. Background

The dramatic increase in desktop computing power driven by intranet-based operations and the increased demand for time-sensitive delivery between users has spurred development of high speed Ethernet LANs. 100BASE-TX Ethernet, using category-5 copper wire, and the newly developing 1000BASE-T Ethernet for Gigabit/s transfer of data over existing category-5 copper wire require new techniques in high speed symbol processing. Gigabit per second transfer can be accomplished utilizing four twisted pairs and a 125 megasymbol/s transfer rate on each pair where each symbol represents two bits. Twisted pair copper cables are also used in wide-area networking (WAN) and digital subscriber loop data communication applications. With ever increasing need for bandwidth, technologies that support high data transfer rates across twisted pair cables are gaining wide acceptance. 100Base-TX (fast Ethernet), 1000Base-T transmission over long haul copper (also known as Gigabit Ethernet) and digital subscriber loop technologies all transmit data at high transmission rates over twisted copper pairs.

Physically, data is transferred using a set of voltages where each voltage represents one or more bits of data. Each voltage in the set of voltages is referred to as a symbol and the whole set of voltages is referred to as a symbol alphabet.

One system of transferring data at high rates is Non Return to Zero (NRZ) signaling. In NRZ signaling, the symbol alphabet $\{A\}$ is $\{-1, +1\}$. A logical "1" is transmitted as a positive voltage while a logical "0" is transmitted as a negative voltage. At 125 M symbols/s, the pulse width of each symbol (i.e. the positive or negative voltage) is 8 ns.

Another system for high speed symbol data transfer is referred to as MLT3 signaling and involves a three voltage level system. (See American National Standard Information system, *Fibre Distributed Data Interface (FDDI)—Part: Token Ring Twisted Pair Physical Layer Medium Dependent (TP-PMD)*, ANSI X3.263:199X). The symbol alphabet for MLT3 is $\{A\}=\{-1, 0, +1\}$, corresponding to the set of voltages $\{-V, 0, V\}$. The voltage V is typically 1 V.

In MLT3 transmission, a logical "1" is transmitted by either a $-1$ or a $+1$ symbol while a logic "0" is transmitted as a 0 symbol. A transmission of two consecutive logic "1"s does not require the system to pass through zero in the transition. A transmission of the logical sequence ("1", "0", "1") would result in transmission of the symbols $(+1, 0, -1)$ or $(-1, 0, +1)$ depending on the symbols transmitted prior to this sequence. If the symbol transmitted immediately prior to the sequence was a $+1$, then the symbols $(+1, 0, -1)$ are transmitted. If the symbol transmitted before this sequence was a $-1$, then the symbols $(-1, 0, +1)$ are transmitted. If the symbol transmitted immediately before this sequence was a 0, then the first symbol of the sequence transmitted will be a $+1$ if the previous logical "1" was transmitted as a $-1$ and will be a $-1$ if the previous logical "1" was transmitted as a $+1$.

In the ideal MLT3 system, the transmit driver simply sends a voltage pulse corresponding to the symbol being transmitted. The pulse is of duration 8 nanoseconds for each one of the transmit symbols and has a finite rise/fall time of three to five nanoseconds (See American National Standard Information system, *Fibre Distributed Data Interface (FDDI)—Part: Token Ring Twisted Pair Physical Layer Medium Dependent (TP-PMD)*, ANSI X3.263:199X).

The detection system in the MLT3 standard, however, needs to distinguish between three voltage levels, instead of two voltage levels in a two level system. The signal to noise ratio required to achieve a particular bit error rate is higher for MLT3 signaling than for two level systems. The advantage of the MLT3 system is that the power spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol.

A block diagram of a typical digital communication transmission system is illustrated in FIG. 1. In FIG. 1, the transmitted data is represented by the symbol sequence $\{a_k\}$. The transmitted symbols in the sequence $\{a_k\}$ are members of the symbol alphabet $\{A\}$. In the case of three level MLT3 signaling, the symbol alphabet $\{A\}$ is given by $\{-1, 0, +1\}$. The index k represents the time index for that symbol, i.e., at sample time k, the symbol being transmitted is given by $a_k$. The channel response is represented by the channel transfer function $f(z)$. The channel function $f(z)$ is the Z-transformation of the sampled time response of the channel.

In FIG. 1, the transmitted symbols $\{a_k\}$ enter the channel 1. The signal output from the channel 1, $x_k$, is a linear distortion of the transmitted symbols $\{a_k\}$, the distortion being described by the channel transfer function $f(z)$. The signal $x_k$ is summed in adder 2 with a noise sample $n_k$ to form the signal $y_k$. The noise samples $\{n_k\}$ represent the random noise on the transmission line. The signal $y_k$, suffering from both the channel distortion and the random noise, is then input to the detector 3. Detector 3 inputs the distorted signals $y_k$, counteracts the effects described by the channel transfer function $f(z)$, and outputs a sequence of detected symbols $\{\hat{a}_k\}$.

FIG. 2 shows a typical 100Base-Tx transmitter. The transmit data path in a 100Base-TX transceiver (IEEE 802.3u Standard) consists of a physical coding sub-layer (PCS) 11, and a physical medium dependent (PMD) sub-layer 12. The PCS 11 contains a medium independent interface (MII) 4 and a 4B5B (rate ⅘) encoder 5. The medium independent interface 4 is the interface between the transceiver and the media access controller (MAC). The 4B5B encoder 5 guarantees sufficient transitions in the transmit data for the purpose of robust clock recovery in the receiver and generates Ethernet control characters. The data rate at the output terminal of the PCS 11 is 125 Mhz due to the rate penalty associated with the 4B5B encoder 5. The physical medium dependent portion 12 of the 100Base-TX transmit data path consists of a scrambler 6, binary to MLT3 converter 7, and a transmit driver 8 which outputs a 1V peak-to-peak signal onto the twisted pair 10 through an isolation transformer 9. The transmit symbol sequence $\{a_k\}$ is generated in the binary to MLT3 converter 7.

It is assumed that the channel model represented by f(z) includes the effect of transmit and receive filtering. In addition, the transmission channel is assumed to be linear in that two overlapping signals simply add as a linear superposition. Therefore, the channel transfer function polynomial can be defined as $$f(Z) = f_0 + f_1 Z^{-1} + f_2 Z^{-2} + \ldots + f_N Z^{-N}, \quad (1)$$

where $f_0, \ldots, f_j, \ldots, f_N$ are the polynomial coefficients. The polynomial coefficient $f_j$ represents the dispersed component of the (k−j)th symbol present in the kth received sample and N is a cut-off integer such that $f_j$ for j>N is negligible. The polynomial f(Z) represents the Z-transformation of the sampled frequency response of the transmission channel. In Equation 1, $Z^{-1}$ is considered to be a one clock period delay. See A. V. OPPENHEIM & R. W. SCHAFER, DISCRETE-TIME SIGNAL PROCESSING 1989.

The noiseless output of the channel at sample time k is then given by $$x_k = f_0^* a_k + f_1^* a_{k-1} + \ldots f_N^* a_{k-N}, \quad (2)$$

where, without loss of generality, $f_0$ can be assumed to be 1. Thus, the channel output signal at time k depends not only on transmitted data at time k, but past values of the transmitted data. This effect is known as "intersymbol interference" (ISI). See E. A. LEE AND D. G. MESSERSCHMITT, DIGITAL COMMUNICATIONS (1988).

Intersymbol interference is a result of the dispersive nature of the communication channel. The IEEE LAN standards require that systems be capable of transmitting and receiving data through at least 100 meters of category-5 cable. FIG. 3A shows a transmission symbol stream with the effects of dispersion. FIG. 3B shows the power spectrum of the dispersed pulse versus frequency. In a 100 meter cable, the signal strength at the Nyquist frequency of 62.5 Mhz is reduced nearly 20 db at the receiving end of the cable. Given this dispersion, a single transmitted symbol may affect several received symbols at the output of the wire.

The noise element of the signal is represented by the sequence $\{n_k\}$. Therefore, the noisy output signal of the channel is given by $$y_k = x_k + n_k, \quad (3)$$

where the noise samples $\{n_k\}$ are assumed to be independent and identically distributed Gaussian random variables (see LEE & MESSERSCHMITT) with variance equal to $\sigma^2$.

Most state-of-the art communication systems use two types of detectors for combating the ISI described by equation (2). These two detectors, Linear Equalization and Decision Feedback Equalization, are shown in FIG. 4A.

A finite impulse response linear equalizer having m+1 multipliers is illustrated in FIG. 4B. In FIG. 4B, the symbol $y_k$ is inputted to a delay array 10 having delays ($D_1$ through $D_m$) which, at each stage, delay the symbol by one time period. A set of multipliers 20 having multipliers $M_0$ through $M_m$ multiply each of the m+1 symbols in the array of delays $D_1$ through $D_m$ by a corresponding coefficient $C_0$ through $C_m$. The adder 30 adds together the output signals from multipliers $M_0$–$M_m$ to obtain the resulting signal $$a_k' = C_0 y_k + C_1 y_{k-1} + \ldots + C_m y_{k-m}. \quad (4)$$

The signal $a_k'$, from the linear equalizer is inputted to slicer 40 which decides on the output symbol $\hat{a}_k$. The output symbol $\hat{a}_k$ is the symbol from the symbol alphabet $\{A\}$ which best approximates the input signal $a_k'$.

The multiplier coefficients, $C_0$ through $C_m$, define a transfer function T given by $$T = C_0 + C_1 Z^{-1} + \ldots + C_m Z^{-m}. \quad (5)$$

The coefficients $C_0$ through $C_m$ may be chosen by an intelligent algorithm in an adaptive implementation in order to optimize the functioning of the equalizer. A zero-forcing linear equalizer (ZFLE) has a transfer function T given by the inverse of the frequency response of the channel. A minimum mean squared error based linear equalizer (MMSE-LE) optimizes the mean squared error between the transmitted data and the detected data, and hence finds a compromise between the un-canceled ISI of the output signal of the equalizer and the output noise variance.

FIG. 4C illustrates a typical finite impulse response Decision Feedback Equalizer (DFE) with $N_{ff}$ multipliers in the feed-forward filter and $N_{fb}$ multipliers in the feed-back filter. The input signal $y_k$ is inputted to the feed-forward filter 100. The resulting signal from the feed-forward filter is added with the negative of the resulting signal from the feed-back filter 200 in adder 300. The added signal $a_k$ is inputted to slicer 400 which determines the output symbol $\hat{a}_k$ of the equalizer.

In feed-forward filter 100, the input signal $y_k$ is inputted to a feed-forward delay array having delays $D_1^{ff}$ through $D_{Nff-1}^{ff}$. Each delay delays the signal by one period so that the delay array 101 stores $N_{ff}$−1 past input signals. Each of the stored signals is multiplied by a corresponding coefficient $C_0$ through $C_{Nff-1}$ by multipliers $M_0^{ff}$ through $M_{Nff-1}^{ff}$. The output signals from the multipliers $M_0^{ff}$ through $M_{Nff-1}^{ff}$ are added together in adder 103 so that the signal inputted to adder 300 on line 301 is given by $$a_k'' = C_0 y_k + C_1 y_{k-1} + \ldots + C_{Nff-1} y_{k-Nff+1}. \quad (6)$$

The feed-back filter 200 inputs the output symbol $\hat{a}_k$ to a feed-back delay array 201 having delays $D_0^{fb}$ through $D_{Nfb-1}^{fb}$. The feed-back delay array 201 stores $N_{fb}$ past determined symbols, $\hat{a}_{k-Nfb}$ through $\hat{a}_{k-1}$. The output symbols of the feed back delay array 201 are inputted to multipliers 202, $M_0^{fb}$ through $M_{Nfb-1}^{fb}$ respectively. The resulting signals from multipliers 202 are added in adder 203 so that the input signal of adder 300 on line 302 is given by $$a_k''' = b_0 \hat{a}_{k-1} + b_1 \hat{a}_{k-2} + b_{Nfb-1} \hat{a}_{k-Nfb}. \quad (7)$$

Adder 300 adds the input signal on line 301 with the negative of the input signal on line 302 to obtain $a_k' = a_k'' - a_k'''$, which is received by slicer 400. Slicer 400 decides on the output symbol $\hat{a}_k$. The output symbol $\hat{a}_k$ arrived at by slicer 400 is the symbol in symbol alphabet $\{A\}$ which most closely approximates the signal $a_k'$ at the input terminal of slicer 400.

The DFE operates on the principle that if the past transmitted data is correctly detected, then the ISI effect of these past data symbols can be canceled from the current received signal prior to detection. For a zero-forcing DFE, the feed-forward transfer function is set to 1 (i.e., $C_0=1$ and $C_1$ through $C_m$ are 0 in the finite impulse response filter of FIG. 4C), and the feedback transfer function is given by [f(z)−1], f(z) being the channel transfer function. Practical implementation of decision feed-back equalizers utilize finite impulse response (FIR) feed-back filters. A finite impulse response filter implements a transfer function which is finite in duration. Infinite impulse response (IIR) filters, those that implement a transfer function which is infinite in duration, have difficulty implementing algorithms for adaptively adjusting the multiplier coefficients.

Since past detected data samples contain no noise, DFE does not suffer from noise enhancement while the linear equalizer does. However, DFE suffers from error propagation; i.e., if one of the past detected symbols is incorrect, then the effects of that error propagate to more symbol decisions in the future.

Also, because the equalizer is a feedback equalizer, pipelining of the feed-back filtering operation is not possible, unlike a linear equalizer whose operation can be pipelined. In particular, a linear equalizer depends only on input signals and therefore can use several clock cycles to perform the computational functions necessary to arrive at an output signal. The effect of using several clock cycles is to enable high speed implementation of the equalizer by splitting the computational load of the equalizer over several clock cycles. A decision feedback equalizer, however, depends on the output of previous symbols to determine the current symbol, i.e., $â_{k-1}$ is necessary to determine $â_k$. Therefore, all computations to determine the symbol $â_k$ need to be accomplished within a single clock cycle, preventing pipelining of the equalizer.

Mathematically, the frequency response of the twisted pair cable can be modeled as $e^{-\beta}$. The exponent $\beta$ is $\alpha l$, $(jf)^{1/2}$ where $\alpha$ is the cable coefficient, l is the length of the cable in meters, and f is the frequency in Mhz. For a category-5 twisted pair cable, $\alpha$ is approximately $3.7 \times 10^{-3}/(m\sqrt{MHz})$ The overall frequency response of the system, including the channel, the TX shaping and the transformer, is given by $$H(f)=H_T(f)e^{-\beta}, \qquad (8)$$

where $H_T(f)$ includes the effects of transmit shaping and transformer frequency response. These effects include the effect of an analog to digital converter, a low pass filter, and a high pass filter. $H_T(f)$ can be approximately modeled by $$H_T(f) = \frac{\sin \pi f T}{\pi f T} \frac{1}{[1+j(f/f_H)]} \frac{jf/f_L}{[1+j(f/f_L)]} \qquad (9)$$

where T=1/125 MHz, $f_L$ is of the order of 25–50 Khz, and $f_H$ is approximately 85 Mhz for the fast Ethernet transmission system.

A sampled impulse response of the channel (a folded spectrum) is given by $$H_{S,\tau}(f)=(1/T)\Sigma_k H_T(f+k/T)e^{-j2\pi f\tau} \qquad (10)$$

where $-0.5/T \leq f < 0.5/T$ and $\tau$ is the timing phase of the sampler that is selected by the clock recovery circuitry in the receiver. See LEE & MESSERSCHMITT.

A typical equalizer implements the channel function f(z) calculated by setting $f(z=e^{j2\pi fT})=H_{S,\tau}(f)$. This process results in the design of an equalizer having 12 or more multipliers.

SUMMARY OF THE INVENTION

In accordance with the invention, an equalizer which takes advantage of the characteristics of the frequency response of the channel is presented. Applicant has observed that the frequency response of the channel is approximated by a function having a series of poles in the denominator. The number of multipliers required to implement the equalizer is equal to the number of terms in the series of poles and, therefore, is minimal.

In the preferred embodiment, a linear equalizer using only two multipliers is presented. In a second embodiment, a decision feedback equalizer utilizing only two multipliers is presented. Both equalizers exploit the observed channel function having a series of poles in the denominator.

A detector embodying this invention has an equalizer with an input terminal to receive an input signal suffering from channel distortion. The channel distortion is described by a channel function with a denominator polynomial of order L and having K denominator polynomial coefficients, L being a positive integer greater than 1 and K being a positive integer less than or equal to L. The equalizer implements a channel function with L delays and K multipliers, each of the K multipliers having a multiplier coefficient equal to a corresponding one of the K denominator polynomial coefficients. The equalizer outputs a corrected signal in response to the K denominator polynomial coefficients and the input signal.

A finite impulse response (FIR) linear equalizer implementing the denominator polynomial is the preferred embodiment of the invention. An infinite impulse response (IIR) decision feedback equalizer implementing an IIR filter in the feed-back section is presented as another embodiment of the invention.

The invention and its embodiments are further described with the figures and the accompanying discussion.

DETAILED DESCRIPTION OF THE INVENTION

Figure 1:
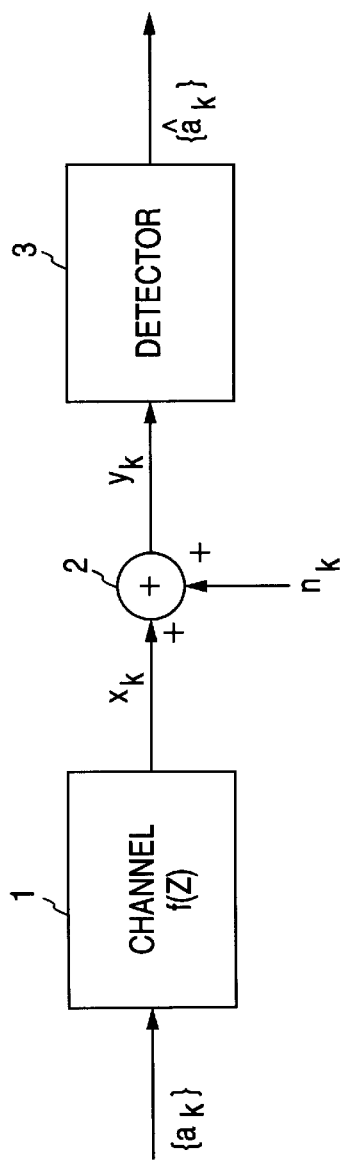
FIG. 1 shows a typical digital communication system.

According to the present invention, a linear equalizer is presented which requires a minimal number of multipliers in the multiplier array. The multiplier coefficients are advantageously chosen to reduce the number of multipliers required.

For category-5 cabling used in fast Ethernet transmission, it is empirically observed that the frequency response of the channel described by Equation 10 can be approximated as $$H_{S,\tau}(z) = gz^{-M}/(1 + b_1 z^{-1} + b_2 z^{-2} + \ldots + b_L z^{-L}) \quad (11)$$

where $z = e^{j2\pi fT}$, g is the channel flat loss factor, M is a fixed delay in baud periods, $\{b_i\}$ are the coefficients of a denominator polynomial and L is a positive integer greater than 1. The denominator polynomial of order L, $1 + b_1 z^{-1} + b_2 z^{-2} + \ldots + b_L z^{-L}$, displayed in Equation 11 is an expansion in a series of poles with the coefficient $b_i$ multiplying the ith order term $z^{-i}$. The denominator polynomial coefficients, $\{b_i\}$, depend on the overall sampled spectrum.

TABLE 1

Coefficients as a function of cable length

| Cable Length (meters) | flat-loss g | As-Calc. $b_1, b_2, b_3$ | As-Meas. $b_1, b_2, b_3$ |
|---|---|---|---|
| 0 | 0.9771 | −0.0614, +0.0090, +0.0090 | −0.0078, +0.0078, +0.0078 |
| 20 | 0.7676 | −0.1002, −0.0157, −0.0056 | −0.1016, −0.0078, −0.0078 |
| 40 | 0.5743 | −0.2375, −0.0253, −0.0195 | −0.2344, −0.0156, −0.0234 |
| 60 | 0.4360 | −0.3593, −0.0189, −0.0325 | −0.3281, −0.0156, −0.0313 |
| 80 | 0.3248 | −0.4912, +0.0116, −0.0457 | −0.4531, +0.0078, −0.04696 |
| 100 | 0.2409 | −0.6323, +0.0698, −0.606 | −0.5625, +0.0234, −0.0703 |

The parameters in Equation 11 are given in Table 1. Table 1 gives values for the flat loss factor g, the first three denominator polynomial coefficients {b1, b2, b3} as-calculated using Equation 10, and values for the first three denominator polynomial coefficients {b1, b2, b3} as empirically measured for varying lengths of category-5 cable. The discrepancy between the as-calculated and as-measured values for the denominator polynomial coefficients is attributable to the model not perfectly representing the channel. However, the model is sufficient to provide the basis on which to implement a detection system.

The Ethernet receiver is designed to "undo" the effects of the frequency distortion $H_{S,\tau}(f)$. From Equation 11, a linear equalizer implemented with the transfer function $$E = (1 + b_1 z^{-1} + b_2 z^{-2} + \ldots + b_L z^{-L}) \quad (12)$$

compensates for the distortion of the channel. The effect of the flat loss g, shown in Table 1 for various cable lengths, is countered by automatic gain control circuitry in the receiver.

In the preferred embodiment of the implementation of the invention, L=3 is found to be a good compromise between performance and complexity. Therefore, the denominator polynomial has terms only through $z^{-3}$ and can be implemented using only three delays and requiring up to three multipliers. In addition, the preferred equalizer is implemented as a finite impulse response linear equalizer and is therefore amenable to pipelining for use in VLSI architectures. In the preferred implementation, the linear equalizer is implemented using pipelining.

It is further found from the as-measured denominator polynomial coefficients shown in Table 1 that the following simplifications in the coefficients result in negligible loss of performance:

$b_1 \leq 0$ for all cable lengths;

$b_2 = 0$ for all cable lengths; and $|b_3| \leq \frac{1}{4}$ for all cable lengths.

Therefore, the preferred equalizer, the linear equalizer, implements the transfer function $$E = (1 + b_1 z^{-1} + b_3 z^{-3}), \quad (13)$$

which is implemented using only two multipliers. In general, a denominator polynomial having L terms will require K multipliers to implement where K is a positive integer greater than 1 but less than or equal to L. An alternative embodiment of the invention is a decision feedback equalizer having a feed-forward filter implementing the transfer function 0.1 and a feed-back filter implementing the transfer function $[H_{S,\tau}(z) - 1]$.

The linear equalizer output signal at sample time k is given by $$a_k = y_k + b_1^k y_{k-1} + b_3^k y_{k-3} \quad (14)$$

where $y_k$ is the equalizer input signal at sample time k. In the preferred embodiment, the coefficients $b_1^k$ and $b_3^k$ are adjusted adaptively for each sample time k. The output signal from a slicer, the decoded MLT3 decision based on the equalizer output signal, at sample time k is given by $$\hat{a}_k = \begin{cases} 1 & \text{if } a_k' > 0.5 \\ 0 & \text{if } 0.5 \geq a_k' > -0.5. \\ -1 & \text{if } -0.5 \geq a_k' \end{cases} \quad (15)$$

Figure 2:
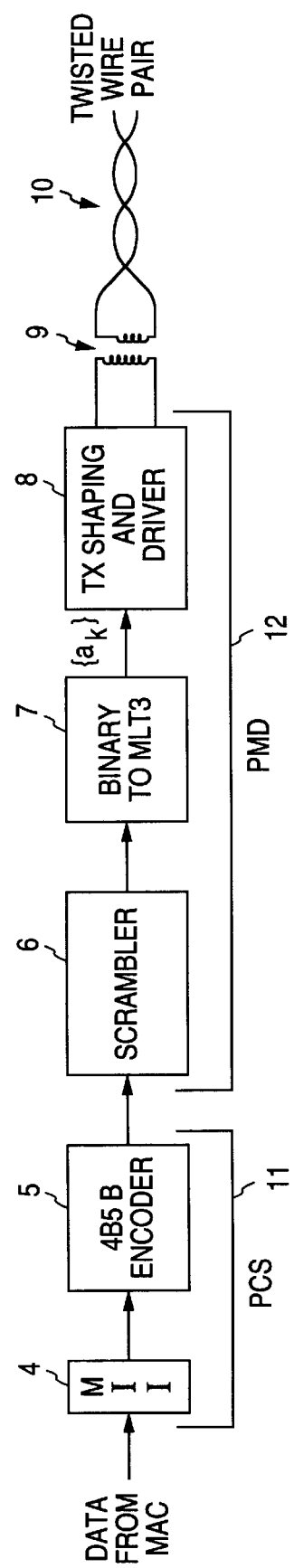
FIG. 2 shows a 100Base-TX transceiver data path for transmitting data.
Figure 3A:
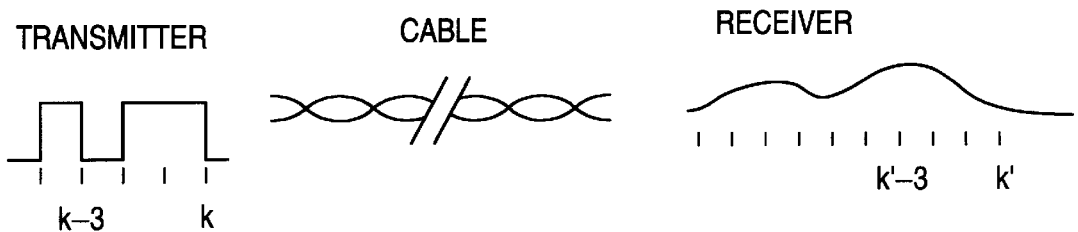
FIG. 3A shows dispersion across the transmission channel.
Figure 3B:
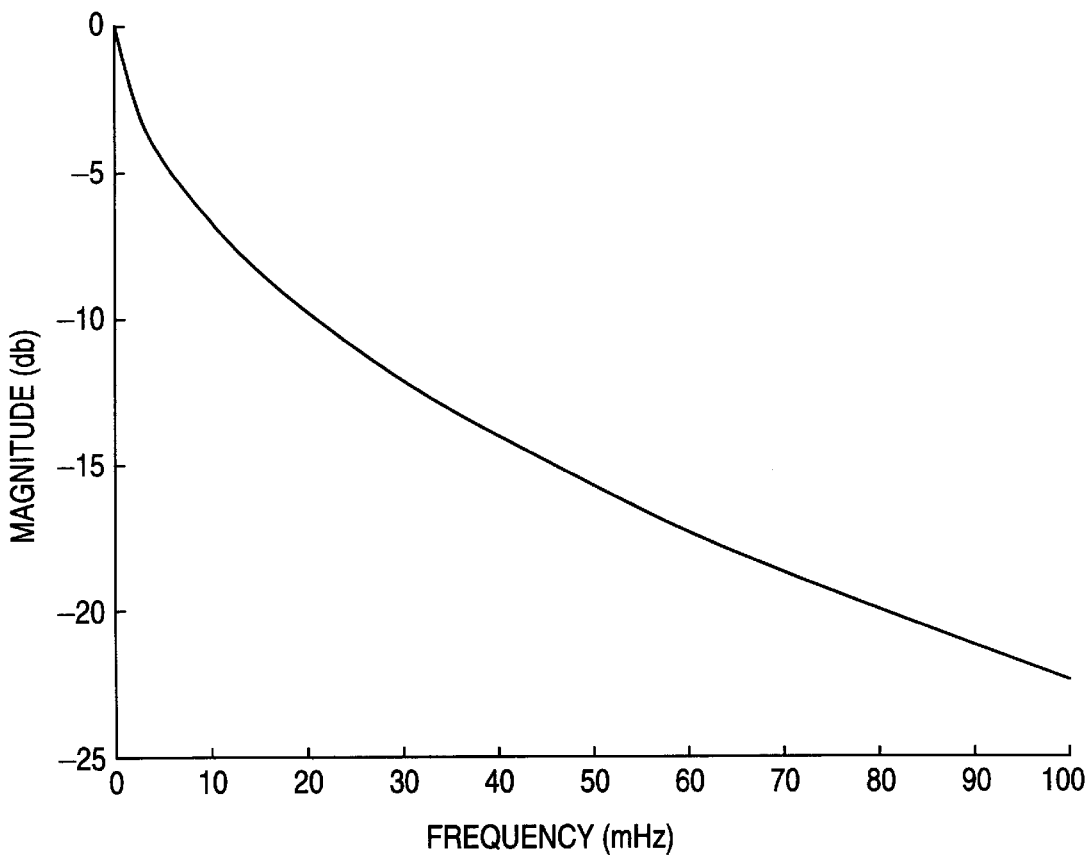
FIG. 3B shows the magnitude response of a typical 100 meter category-5 cable.
Figure 4A:
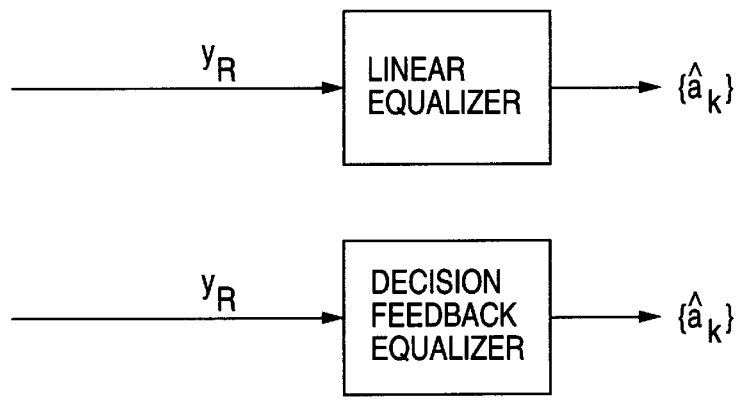
FIG. 4A shows two typical detectors used in a digital communication system.
Figure 4B:
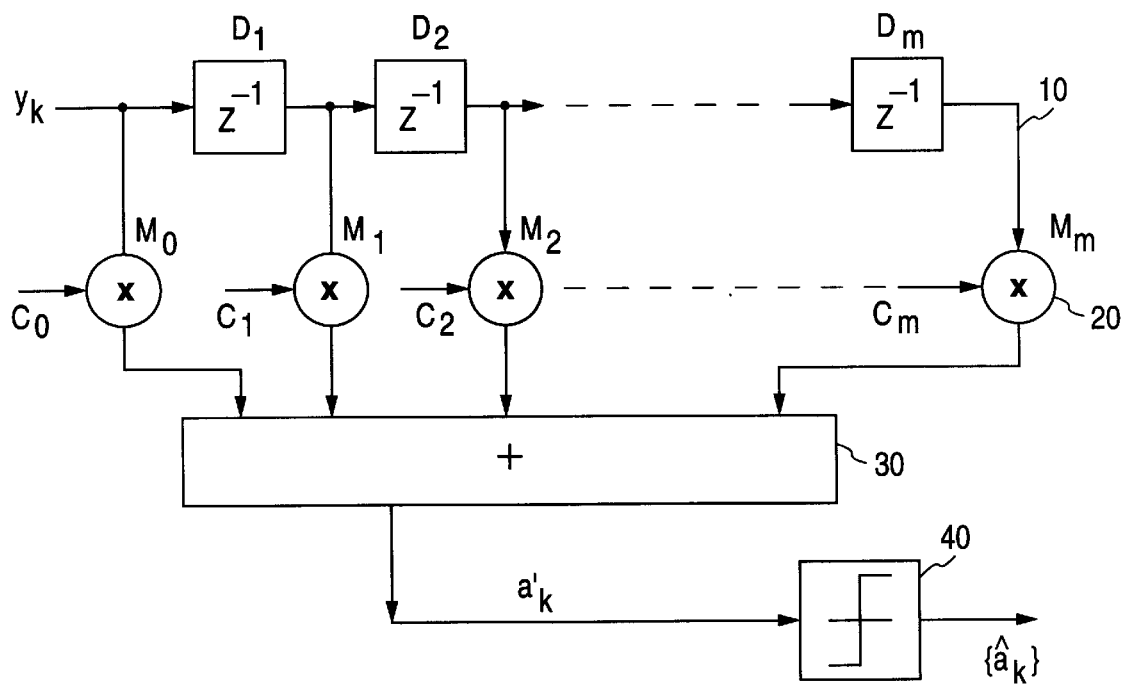
FIG. 4B shows a typical linear equalizer.
Figure 4C:
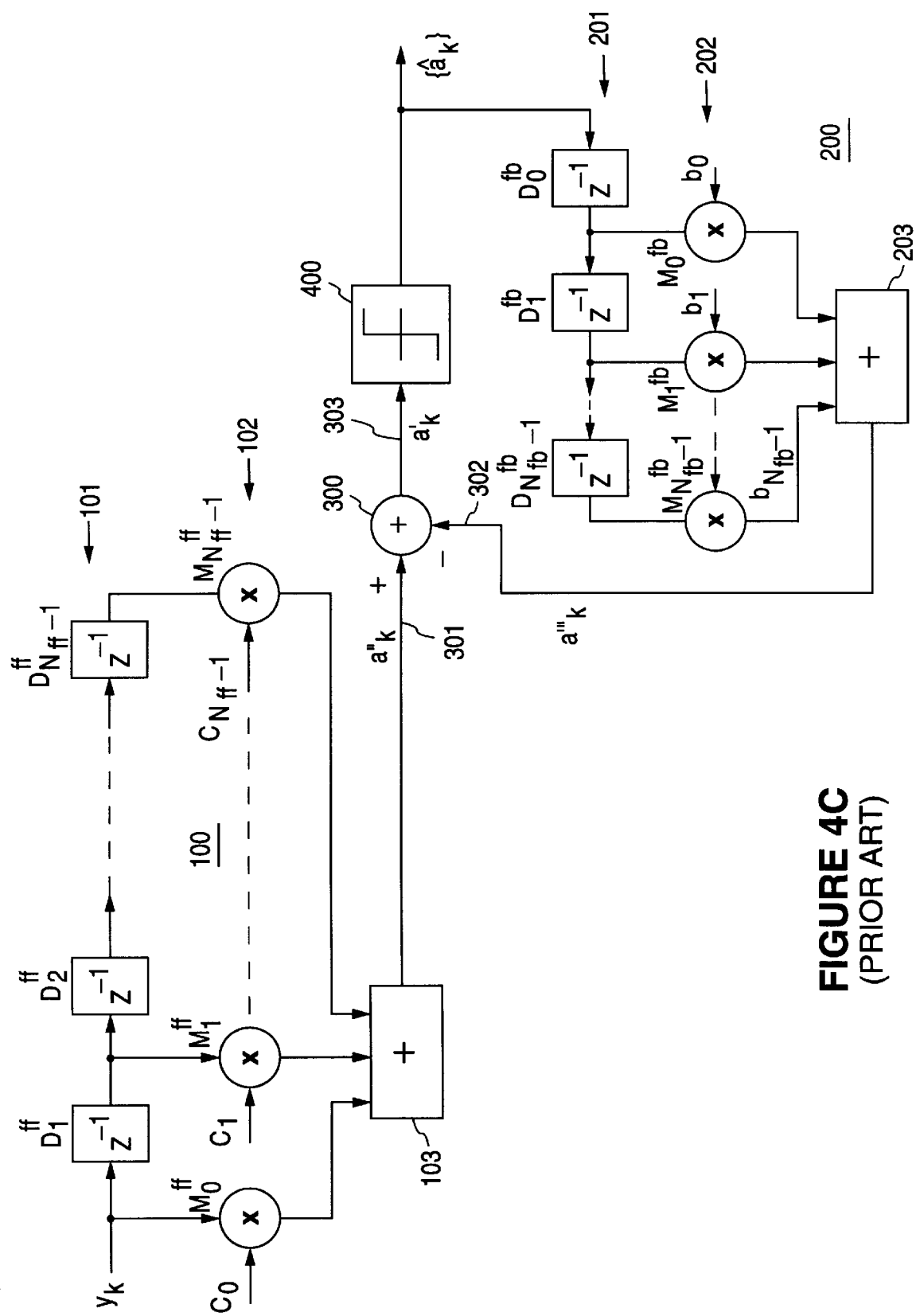
FIG. 4C shows a typical decision feedback equalizer.

In the preferred implementation, the coefficients $b_1^k$ and $b_3^k$ are adaptively chosen by a least mean squares (LMS) algorithm. Measured coefficients for various cable lengths are given in Table 1 but are adjusted at each sample time to optimize the linear equalizer. The coefficients depend on the cable length, transmit shape 8 and transformer 9 characteristics (see FIG. 2). In the linear equalizer embodiment, coefficients are updated for sample time (k+1) according to the following recursion:

$$b_1^{k+1} = b_1^k - \gamma(a_k' - \hat{a}_k)y_{k-1}$$
$$b_3^{k+1} = b_3^k - \gamma(a_k' - \hat{a}_k)y_{k-3} \quad (16)$$

where the constant $\gamma$ is the update constant. The update constant $\gamma$ controls the rate of correction of the multiplier coefficients, which, as seen from Equation 16, is based on the calculated error, $a_k' - \hat{a}_k$, in the equalizer output. The update recursion shown in Equation 16 allows the receiver to react to the changes in the channel by correcting for the error. The channel changes with various factors including age and environmental temperature variations.

Several considerations determine the value of the update constant $\gamma$. If $\gamma$ is too low, then the update recursion will be too slow in converging on optimum values for the multiplier coefficients $b_1^{k+1}$ and $b_3^{k+1}$. If $\gamma$ is too large there will be a larger error in the multiplier coefficients $b_1^{k+1}$ and $b_3^{k+1}$ with respect to their optimum values. The continuous feedback in the update recursion, which is controlled by $\gamma$, causes the multiplier coefficients $b_1^{k+1}$ and $b_3^{k+1}$ to oscillate around optimum values with a variation dependent on the value of $\gamma$. In the preferred embodiment, $\gamma$ is chosen to be large, $1 \times 10^{-3}$, on start-up of the receiver and is reduced to about $1 \times 10^{-4}$ for continuous operation of the receiver. In this way, rapid convergence to optimum values of the multiplier coefficients is achieved and the receiver responds to variations in the channel while oscillations around the optimum values of the multiplier coefficients are minimized.

Figure 5:
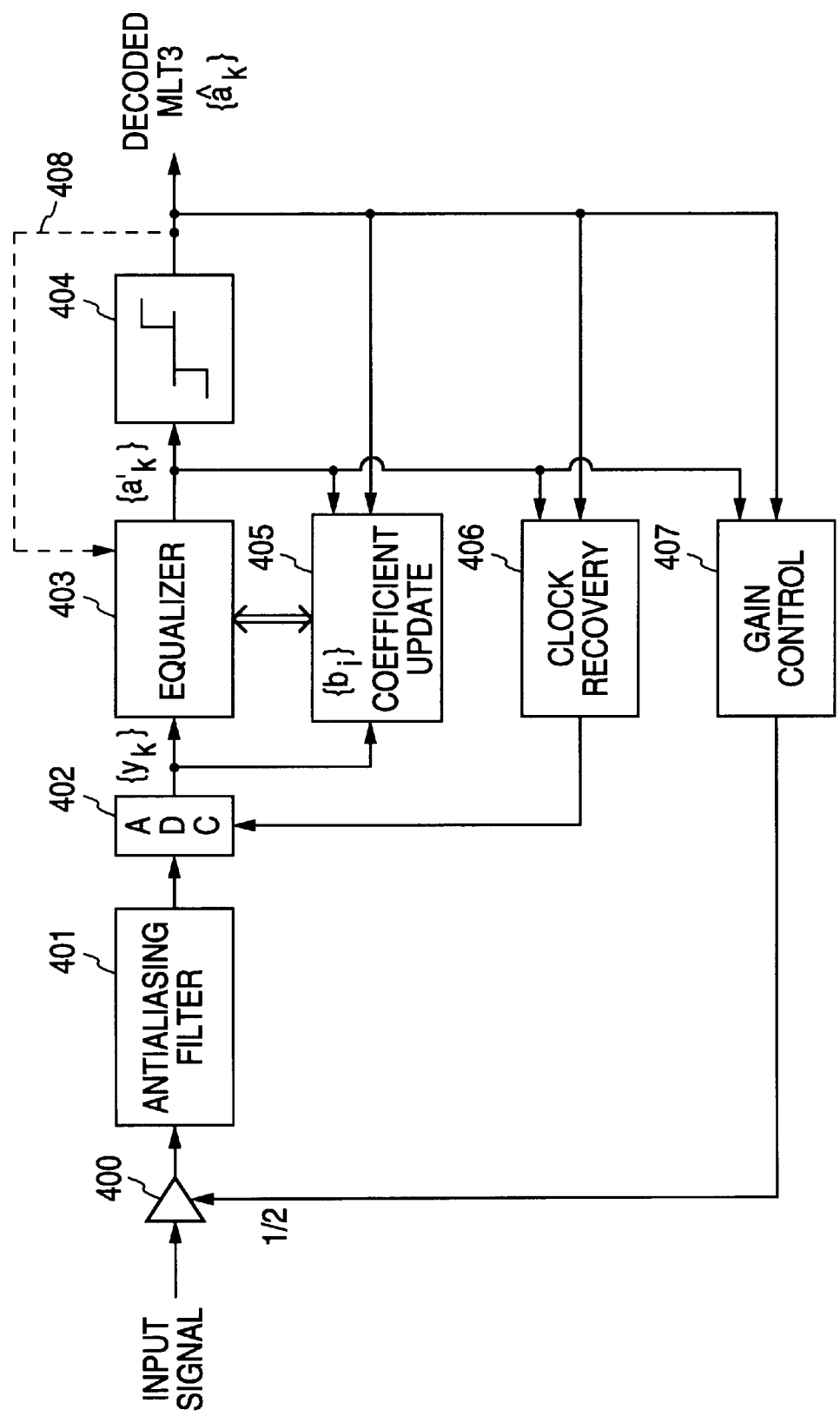
FIG. 5 shows a 100Base-TX receiver according to the present invention.

FIG. 5 shows a 100 Base TX receiver utilizing this invention. The input signal from the twisted copper pair is input to an amplifier 400 which compensates for the channel flat loss factor g by amplifying the input signal by a gain of 1/g. The gain is adjusted by gain control 407 in order to optimize the receiver function. Measured relative values of g for several cable lengths are given in Table 1.

The anti-aliasing filter 401 prevents anti-aliasing by passing the input signal through a low pass filter to reject out-of-band noise. The analog to digital converter (ADC) 402 samples and holds the input signal for a duration of 8 ns. The digitized signals $y_k$ are then input to equalizer 403. In equalizer 403, the effects of the channel distortion are countered and the equalizer 403 outputs signal $a_k'$. If equalizer 403 is the linear equalizer implementation then Equation 14 is implemented approximately and if the equalizer 403 is a decision feedback equalizer then the feed-forward filter implements 1 and the feed-back filter implements approximately $[H_{S,T}(z)-1]$. In addition, if a decision feedback equalizer is implemented line 408 is inserted to provide the feed-back section of the equalizer 403 with the result from slicer 404. Slicer 404 inputs signal $a_k'$ from equalizer 403 and decides on the output symbol $\hat{a}_k$ by implementing Equation 15.

The multiplier coefficients $\{b_i\}$ are adaptively chosen in the coefficient update block 405. The multiplier coefficients correspond to the denominator polynomial coefficients shown as a function of cable length in Table 1. Coefficient update 405 implements Equation 16 for a linear equalizer and adjusts the multiplier coefficients on each time period. Clock recovery 406 tracks the timing of the circuit and adjusts the timing phase $\tau$ for the sample and hold function of the analog to digital converter (ADC) 402. Clock recovery 406 adjusts the timing phase $\tau$ by estimating the zero crossings in the signal $a_k'$. Gain control 407 adjusts the gain of multiplier 400 by comparing the modulus of signal $a_k'$ with a target threshold value. The gain of multiplier 400 compensates for the channel flat loss factor g in Equation 11.

Figure 6:
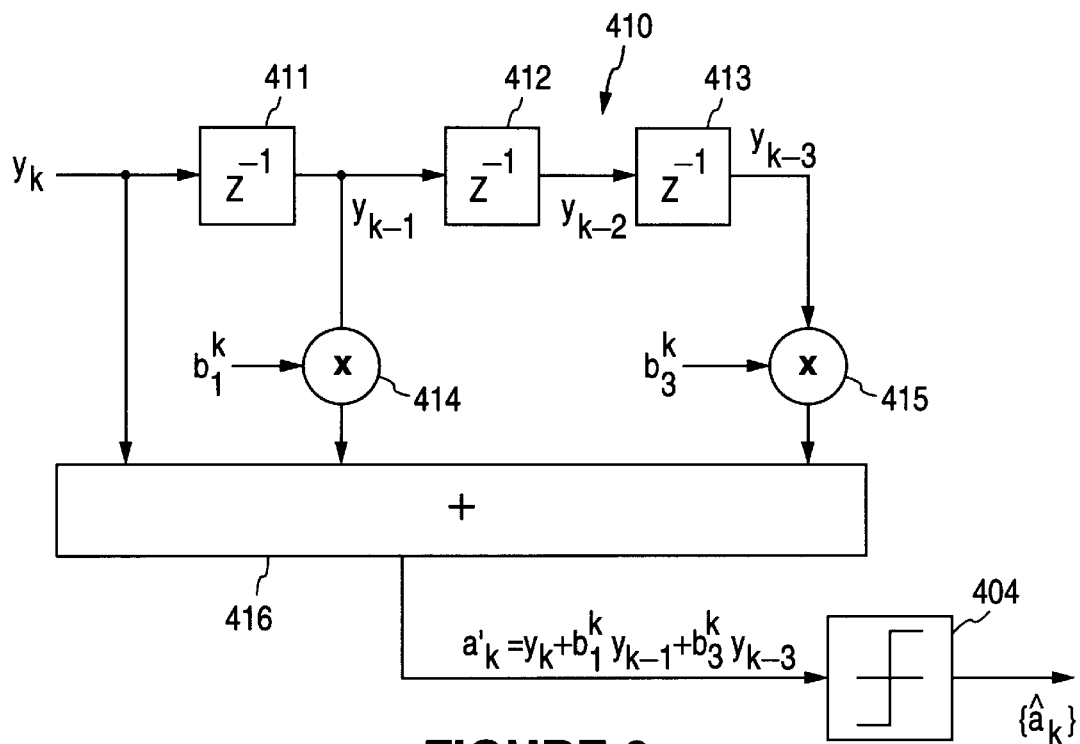
FIG. 6 shows the preferred detection system utilizing a linear equalizer.

FIG. 6 shows the preferred implementation of the equalizer 403 in the 100Base TX receiver of FIG. 5. The equalizer implements the transfer function of Equation 13. Equalizer 410 in FIG. 6 is a finite impulse response linear equalizer having two multipliers 414 and 415 and three delays 411, 412 and 413, each of which delays the signal by one clock period. The signal $y_k$ is input to delay 411 and to adder 416. The output signal of delay 411, $y_{k-1}$, is input to delay 412 and multiplied by $b_1^k$ in multiplier 414. The output signal of multiplier 414, $b_1^k y_{k-1}$, is input to adder 416. The output signal of delay 412, $y_{k-2}$, is input to delay 413. The output signal of delay 413, $y_{k-3}$, is multiplied by $b_3^k$ in multiplier 415. The output signal of multiplier 415, $b_3^k y_{k-3}$, is inputted to adder 416. The output signal of adder 416, $y_k + b_1^k y_{k-1} + b_3^k y_{k-3}$, is the signal $a_k'$ of Equation 14 which is input to slicer 404. In general, an implementation of the linear equalizer also includes an implementation of a second transfer function in addition to the above described transfer function. In the prefered implementation, the second transfer function is 1.

Figure 7:
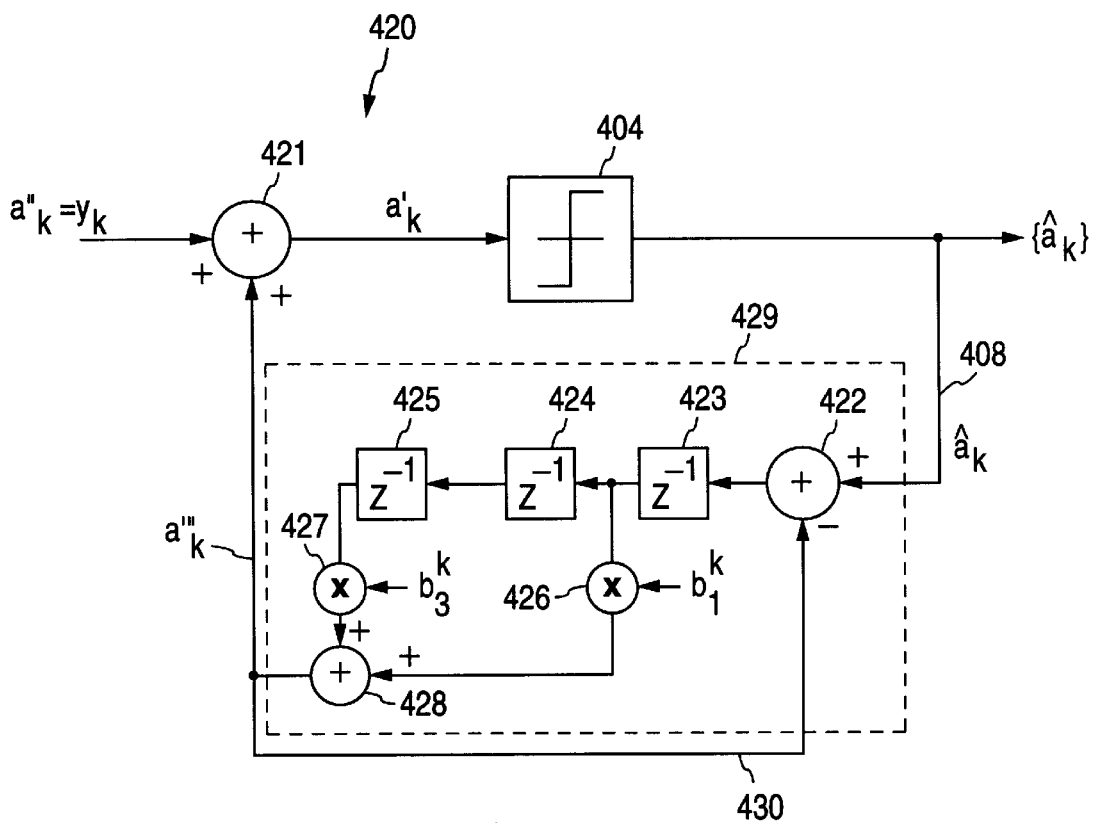
FIG. 7 shows a decision feedback equalizer according to the present invention.

FIG. 7 shows an infinite impulse response decision feedback equalizer 420 according to this invention. The decision feedback equalizer 420 is also implemented with only two multipliers, multipliers 426 and 427, in the implementation of the denominator polynomial minus 1 as part of the feed-back filter 429 of the decision feedback equalizer 420. In FIG. 7, the feed-forward portion of the decision feedback equalizer 420 has been set to one so that $a_k''$ is equal to the input signal $y_k$ and is input directly to adder 421. In general, the feed-forward portion of the feedback equalizer implements a feed-foward transfer function.

The output signal from slicer 404, $\hat{a}_k$, of FIG. 5 is input, through line 408, to adder 422. Adder 422 adds the output symbol from the slicer 404, $\hat{a}_k$, to the output signal of feed-back filter 429, $a_k'''$. The output signal of adder 422 is input to delay 423. The output signal of delay 423 is input to delay 424 and multiplier 426. Multiplier 426 multiplies the output signal from delay 423 by $b_1^k$ and inputs the resulting signal to adder 428. The output signal from delay 424 is input to delay 425. The output signal from delay 425 is input to multiplier 427. Multiplier 427 multiplies the output signal of delay 425 by $b_3^k$. The output signal from multiplier 427 is added to the output signal from multiplier 426 in adder 428. Adder 421 subtracts the output signal from adder 428, $a_k'''$, from the input symbol $y_k$ to obtain $a_k'$ which is input to slicer 404.

Delays 423, 424 and 425, multipliers 426 and 427 and adder 428 of feed-back filter 429 implements the transfer function $b_1^k z^{-1} + b_3^k z^{-3}$. The feedback provided by line 430 causes the feed-back filter 429 to implement the channel function $$T(z) = (b_1 z^{-1} + b_3 z^{-3})/(1 + b_1 z^{-1} + b_3 z^{-3}). \tag{17}$$

The channel function in Equation 17 is the negative of the channel response of Equation 11—without the fixed delay or flat loss factor and with L=3 and $b_2=0$—minus 1. The output signal of the equalizer, $a_k'$, therefore, is $$a_k' = y_k + b_1^k(\hat{a}_{k-1} - a_{k-1}''') + b_3^k(\hat{a}_{k-3} - a_{k-3}''') \tag{18}$$

where the coefficients $b_1^k$ and $b_3^k$ are adaptively adjusted by coefficient updater 405 to optimize the equalizer, $a_k''$ is the output signal of the feed-forward filter, $y_k$, and $a_k'''$ is the output signal of the feed-back filter 429. As before, slicer 404 implements Equation 15 and decides on the output symbol $\hat{a}_k$.

An alternative embodiment of the decision feedback equalizer implements a channel function corresponding to f(z)-1, -T(z) of Equation 17. In that case, $a_k' = y_k + b_1^k(\hat{a}_{k-1} + a_{k-1}''') + b_3^k(\hat{a}_{k-3} + a_{k-3}''')$. In both embodiments, adder 421 adds the input signals $y_k$ and $a_k'''$ together. In this alternative embodiment, adder 422 also adds both of the input signals, $\hat{a}_k$ and $a_k'''$, together as opposed to subtracting $a_k'''$ from $\hat{a}_k$ as shown in FIG. 7.

The coefficients $b_1^k$ and $b_3^k$ in the decision feedback equalizer are adaptively chosen by coefficient updater 405 according to the following recursive equation:

$$b_1^{k+1} = b_1^k - \gamma e_k(\hat{a}_{k-1}' - a_{k-1}''')$$

$$b_3^{k+1} = b_3^k - \gamma e_k(\hat{a}_{k-3}' - a_{k-3}''') \quad (19)$$

where $e_k = a_k' - \hat{a}_k$. The update constant $\gamma$ is again chosen, with the same considerations as in Equation 16 for the linear equalizer, to optimize convergence to the optimum multiplier coefficients for the equalizer. Note that in the implementation of Equation 19 (see FIG. 5) the coefficient updater 405 inputs the output signal of the feed-back filter of decision feedback equalizer 420, $a_k'''$. Also, in a more general IIR decision feedback equalizer, if the feed-back multipliers present in the feed-back filter of the decision feedback equalizer implement the transfer function $f_1 z^{-1} + f_2 z^{-2} + \ldots + f_j z^{-j} + \ldots + f_L z^{31\ L}$, then the coefficient $f_j^{k+1}$ is adaptively chosen using the recursive equation $f_j^{k+1} = f_j^k - \gamma e_k (\hat{a}_{k-j}' - a_{k-j}''')$.

The embodiments of the invention described above are demonstrative only. Modifications of these embodiments obvious to one skilled in the art are within the scope of this application. As such, the scope of this application is limited only by the following claims.

I claim:

1. A detector system comprising an equalizer, the equalizer comprising:

an input terminal for receiving an input signal, the input signal suffering from a channel distortion described by a channel function having a denominator polynomial of order L hazing K denominator polynomial coefficients, L being a positive integer greater than 1 and K being a positive integer greater than or equal to 1 and less than or equal to L;

an implementation of a transfer function, the transfer function being substantially the inverse of the channel function, the implementation having L delays coupled in series and K multipliers, each of the K multipliers having a multiplier coefficient corresponding to one of the K denominator polynomial coefficients, each of the K multipliers coupled to receive an output signal from one of the L delays, and an adder coupled to receive output signals from each of the K multipliers; and an output terminal coupled to the implementation for outputting a corrected signal in response to the K denominator polynomial coefficients and the input signal, wherein:

L=; and the L delays include a first delay, a second delay, and a third delay coupled in series, each of the first delay, the second delay and the third delay delaying the input signal by one clock, cycle, the first delay receiving the input signal; wherein:

K=2;

the K multipliers include a first multiplier and a second multiplier, the first multiplier having a first coefficient and the second multiplier having a second coefficient, the first multiplier receiving a first delayed signal from the first delay and outputting at a first output terminal the first delayed signal multiplied by the first coefficient, the second multiplier receiving a third delayed signal from the third delay and outputting at a third output terminal the third delayed signal multiplied by the second coefficient; and the adder is coupled to the input terminal of the equalizer, the first output terminal and the third output terminal and which outputs the sum of the first delayed signal multiplied by the first coefficient, the third delayed signal multiplied by the second coefficient, and the input signal as the corrected signal of the equalizer.

2. The system of claim 1, further comprising:

a slicer having an input terminal coupled to the output terminal of the equalizer to receive the corrected signal and having an output terminal for outputting an output symbol in response to the corrected signal.

3. The system of claim 2, wherein the equalizer has a coefficient input terminal for receiving the corresponding multiplier coefficient of each of the K multipliers, and further comprising:

a coefficient updater having a coefficient output terminal coupled to the coefficient input terminal of the equalizer, the coefficient updater adaptively adjusting the corresponding multiplier coefficient of each of the K multipliers in response to the input signal, the corrected signal and the output symbol.

4. The system of claim 1, wherein the first coefficient and the second coefficient are adaptively chosen by a coefficient updater coupled to the equalizer.

5. The system of claim 1, wherein the first coefficient is less than or equal to 0 and the second coefficient has a magnitude less than or equal to about 0.25.

6. The system of claim 1, further including an implementation of a second transfer function, an output terminal of the implementation of the second transfer function being coupled to an input terminal of the implementation of the transfer function.

7. A detector system comprising an equalizer, the equalizer comprising:

an input terminal for receiving an input signal, the input signal suffering from a channel distortion described by a channel function having a denominator polynomial of order L having K denominator polynomial coefficients, L being a positive integer greater than 1 and K being a positive integer greater than or equal to 1 and less than or equal to L;

an implementation of a transfer function, the transfer function being substantially the inverse of the channel function, the implementation having L delays coupled in series and K multipliers, each of the K multipliers having a multiplier coefficient corresponding to one of the K denominator polynomial coefficients, each of the K multipliers coupled to receive an output signal from one of the L delays, and an adder coupled to receive output signals from each of the K multipliers;

an output terminal coupled to the implementation for outputting a corrected signal in response to the K denominator polynomial coefficients and the input signal;

a slicer having an input terminal coupled to the output terminal of the equalizer to receive the corrected signal and having an output terminal for outputting an output symbol in response to the corrected signal;

wherein the equalizer includes a decision feedback equalizer having feed-forward portion and a feed-back portion, the feed-back portion having a feed-back input terminal for receiving the output symbol, the feedback portion being the implementation of the transfer function; and wherein L=3; and the L delays include a first delay, a second delay, and a third delay coupled in series, each of the first delay, the second delay and the third delay delaying the output symbol by one clock cycle, the first delay having an input terminal coupled to the feed-back input terminal; wherein K=2;

the K multipliers include a first multiplier and a second multiplier, the first multiplier having a first coefficient and the second multiplier having a second coefficient, the first multiplier receiving a first delayed signal from the first delay and outputting the first delayed signal multiplied by the first coefficient, the second multiplier receiving a third delayed signal from the third delay and outputting the third delayed signal multiplied by the second coefficient;

a first adder coupled to output terminals of the first multiplier and the second multiplier and having an output terminal for outputting an output signal, the output signal being the sum of the first delayed signal multiplied by the first coefficient and the third delayed signal multiplied by the second coefficient;

a third adder coupled to the output terminal of the first adder and receiving the output symbol, the third adder outputting the difference between the output symbol and the output signal of the first adder to the input terminal of the first delay; and a second adder coupled to the output of the first adder and the feed-forward portion of the equalizer, the second adder outputting the corrected signal, the corrected signal being the sum of an output signal from the feed-forward portion of the equalizer and the output signal of said first adder.

8. The system of claim 7, wherein the first coefficient and the second coefficient are adaptively adjusted by a coefficient updater coupled to the equalizer.

9. The system of claim 8, wherein the first coefficient is less than or equal to 0 and the third coefficient has a magnitude less than or equal to about 0.25.

10. The system of claim 7, wherein the feed-forward portion of the equalizer implements a transfer function equal to 1.

11. The system of claim 9, wherein the feed-foward portion of the equalizer implements a transfer function equal to 1.

* * * * *

UNITED STATES PATENT AND TRADEMARK OFFICE
CERTIFICATE OF CORRECTION

PATENT NO. : 6,115,418  
DATED : September 5, 2000  
INVENTOR(S) : Sreen A. Raghavan Page 1 of 1

It is certified that error appears in the above-identified patent and that said Letters Patent is hereby corrected as shown below:

Column 11,
Line 53, delete "L=; and" and insert -- L=3; and --.

Signed and Sealed this

Twenty-fifth Day of December, 2001

*Attest:*

JAMES E. ROGAN
*Attesting Officer*  *Director of the United States Patent and Trademark Office*